United States Patent
Jang et al.

(10) Patent No.: US 11,799,313 B2
(45) Date of Patent: Oct. 24, 2023

(54) POWER CONVERSION DEVICE AND VEHICLE POWER CONVERSION SYSTEM INCLUDING SAME

(71) Applicant: KOREA BTS Co., Ltd., Ulsan (KR)

(72) Inventors: Jung Un Jang, Goyang-si (KR); Yong Bin Kim, Bucheon-si (KR); Hyoung Min Jun, Incheon (KR)

(73) Assignee: KOREA BTS Co., Ltd., Ulsan (KR)

( * ) Notice: Subject to any disclaimer, the term of this patent is extended or adjusted under 35 U.S.C. 154(b) by 0 days.

(21) Appl. No.: 17/729,648

(22) Filed: Apr. 26, 2022

(65) Prior Publication Data

US 2023/0163619 A1    May 25, 2023

(30) Foreign Application Priority Data

Nov. 25, 2021  (KR) .......................... 10-2021-0164554

(51) Int. Cl.
*H02J 7/14*    (2006.01)
*H02J 7/00*    (2006.01)

(52) U.S. Cl.
CPC .......... *H02J 7/1423* (2013.01); *H02J 7/0063* (2013.01)

(58) Field of Classification Search
CPC .............................. H02J 7/1423; H02J 7/0063
See application file for complete search history.

(56) References Cited

U.S. PATENT DOCUMENTS

| | | | | |
|---|---|---|---|---|
| 2019/0160972 A1* | 5/2019 | Zeiler | ...................... | B60L 50/66 |
| 2021/0194269 A1* | 6/2021 | Gonring | ................ | B60R 16/033 |
| 2022/0016982 A1* | 1/2022 | Johnson | ................... | H02J 7/342 |
| 2022/0055468 A1* | 2/2022 | Maruyama | ............ | H01M 50/20 |
| 2022/0258647 A1* | 8/2022 | Joao | ....................... | H01M 10/46 |

FOREIGN PATENT DOCUMENTS

| | | |
|---|---|---|
| KR | 10-0794182 B1 | 1/2008 |
| KR | 10-2009-0118441 A | 11/2009 |
| KR | 10-1079640 B1 | 11/2011 |
| KR | 10-2015-0020415 A | 2/2015 |
| KR | 10-1654002 B1 | 9/2016 |
| KR | 10-1713666 B1 | 3/2017 |
| KR | 10-1860421 B1 | 6/2018 |

* cited by examiner

*Primary Examiner* — Jared Fureman
*Assistant Examiner* — Duc M Pham
(74) *Attorney, Agent, or Firm* — WHDA, LLP

(57) ABSTRACT

Proposed is a power conversion device, the device including: a power generation unit for converting kinetic energy generated by an engine of a vehicle into electrical energy; a storage unit including a first battery and a second battery for storing the electrical energy generated by the power generation unit; a load unit for operating by receiving the electrical energy stored in the storage unit; a power conversion unit for controlling supply of power from the first battery and the second battery to the load unit according to a conversion control signal; and a charging unit for charging at least one of the first battery and the second battery on the basis of the electrical energy according to a charging control signal, wherein, when a vehicle state is in start-up ON, the power conversion unit connects the first battery and the load unit.

9 Claims, 3 Drawing Sheets

POWER CONVERSION DEVICE AND VEHICLE POWER CONVERSION SYSTEM INCLUDING SAME

TECHNICAL FIELD

An embodiment of the present disclosure relates to a power conversion device and a vehicle power conversion system including same and, in particular, to a power conversion device and a vehicle power conversion system including same capable of automatically converting a power source applied to a load according to a state of an engine of a vehicle.

The present application claims priority to Korean Patent Application No. 10-2021-0164554, filed Dec. 1, 2021, the entire contents of which are incorporated herein for all purposes by this reference.

BACKGROUND ART

As an application of electronic equipment to a vehicle accelerates, types of electronic equipment mounted on the vehicle are diversified, and the amount of the electronic equipment on the vehicle is rapidly increasing. In addition, when the vehicle is utilized or modified for a special purpose such as a camper or a refrigerated vehicle, the amount of electronic equipment mounted on the vehicle is further increased, and the required power capacity is also increasing.

To this end, the vehicle is equipped with various power sources for using the above-described electronic equipment. Representatively, there is a generator, a vehicle battery, or the like that generates electrical power from an engine while the vehicle is driving. Pieces of electronic equipment should be continuously supplied with sufficient electrical power, and failure to supply sufficient electrical power may result in vehicle breakdown.

Recently, as the amount of electronic equipment mounted on a vehicle increases and electrical power required by each piece of electronic equipment increases, the vehicle is provided with a separate auxiliary battery for driving the electronic equipment. However, a commonly used auxiliary battery has a problem in that it has a different usage specification from a generator of an existing vehicle. Due to such a difference, there is a problem in that the power supply from the vehicle power source to the electronic equipment becomes unstable, and the instability of the electrical power supply is one of the biggest causes of failure of the electronic equipment mounted in the vehicle.

In addition, there is an increasing number of vehicles equipped with electronic equipment that should always operate regardless of start-up ON/OFF states such as a refrigeration facility or a camping facility. In this case, there is a demand for a power conversion system capable of switching power supply to electronic equipment according to a start-up state.

DOCUMENT OF RELATED ART (Patent Document 1) Korean Patent No. 10-1713666 (Title of the Invention: Vehicle power managing apparatus, Issue Date: Mar. 2, 2017)

(Patent Document 2) Korean Patent No. 10-1079640 (Title of the Invention: Auxiliary heating and cooling device for vehicles, Issue Date: Oct. 28, 2011)

DISCLOSURE

Technical Problem

Accordingly, the present disclosure has been made keeping in mind the above problems occurring in the related art, and an objective of the present disclosure is to provide a power conversion device and a vehicle power conversion system including same capable of stably supplying electrical power to a load according to a vehicle state.

Another objective of the present disclosure is to provide the power conversion device and the vehicle power conversion system including same capable of improving productivity by lowering manufacturing cost while maintaining a high switching speed.

Technical Solution

In order to achieve the above objective, according to one aspect of the present disclosure, there may be provided a power conversion device, the device including: a power generation unit for converting kinetic energy generated by an engine of a vehicle into electrical energy; a storage unit including a first battery and a second battery for storing the electrical energy generated by the power generation unit; a load unit for operating by receiving the electrical energy stored in the storage unit; a power conversion unit for controlling supply of power from the first battery and the second battery to the load unit according to a conversion control signal; and a charging unit for charging at least one of the first battery and the second battery on the basis of the electrical energy according to a charging control signal, wherein, when a vehicle state is in start-up ON, the power conversion unit connects the first battery and the load unit, when the vehicle state is in start-up OFF, the power conversion unit connects the second battery and the load unit, and the second battery is coupled to be detachable to the vehicle independently of the first battery.

In addition, the power conversion unit may include: a first terminal to which the first battery is connected; a second terminal to which the second battery is connected; and a motor switch connected to the load unit and configured to rotate according to a switching control signal for connecting the load unit to any one of the first terminal and the second terminal.

In addition, when the vehicle state is changed from the start-up OFF to the start-up ON, the charging unit may charge only the first battery during a stabilization period, and after the stabilization period elapses, the power conversion unit may connect the first battery and the load unit.

In addition, the first battery may have a first reference voltage, the second battery may have a second reference voltage, and the first reference voltage and the second reference voltage may be different from each other.

In addition, the first reference voltage may be smaller than the second reference voltage.

In addition, the device may further include: a first detection unit for generating first detection information by detecting an operating state of the engine of a vehicle; a second detection unit for generating second detection information by detecting a state of charge of at least one of the first battery and the second battery; a third detection unit for generating third detection information by detecting the amount of power demand of the load unit; and a controller for generating at least one of the switching control signal and the charging control signal on the basis of the first detection information, the second detection information, and the third detection information.

In addition, the second battery may be integrated as a battery module with at least one of the charging unit, the power conversion unit, the first detection unit, the second detection unit, the third detection unit, and the controller to be integrally implemented.

In addition, when the second battery is in a full or overcharged state, the charging unit may charge only the first battery.

In addition, when the vehicle state is in the start-up ON, and when the amount of power demand of the load unit is changed, the charging unit may control the amount of charging each of the first battery and the second battery.

According to one aspect of the present disclosure, there may be provided a vehicle power conversion system including same, the system including: a power conversion device for controlling supply of power to at least one piece of electronic equipment according to a state of a vehicle; a server device for monitoring an operation state of the power conversion device through a wireless network and storing operation history; and a user device for checking the operation history of the power conversion device through access to the server device, wherein the power conversion device comprises: a power generation unit for converting kinetic energy generated by an engine of the vehicle into electrical energy; a storage unit including a first battery and a second battery for storing the electrical energy generated by the power generation unit; a load unit for operating by receiving the electrical energy stored in the storage unit; a power conversion unit for controlling supply of power from the first battery and the second battery to the load unit according to a conversion control signal; and a charging unit for charging at least one of the first battery and the second battery on the basis of the electrical energy according to a charging control signal, wherein, when a vehicle state is in start-up ON, the power conversion unit connects the first battery and the load unit, when the vehicle state is in start-up OFF, the power conversion unit connects the second battery and the load unit, and the second battery is coupled to be detachable to the vehicle independently of the first battery.

Advantageous Effects

As described above, the power conversion device of the present disclosure and the vehicle power conversion system including same have an effect capable of stably supplying power to a load according to a vehicle state.

In addition, the power conversion device of the present disclosure and the vehicle power conversion system including the same have an effect capable of improving productivity by lowering manufacturing costs while maintaining a high switching speed.

MODE FOR DISCLOSURE

Figure 1:
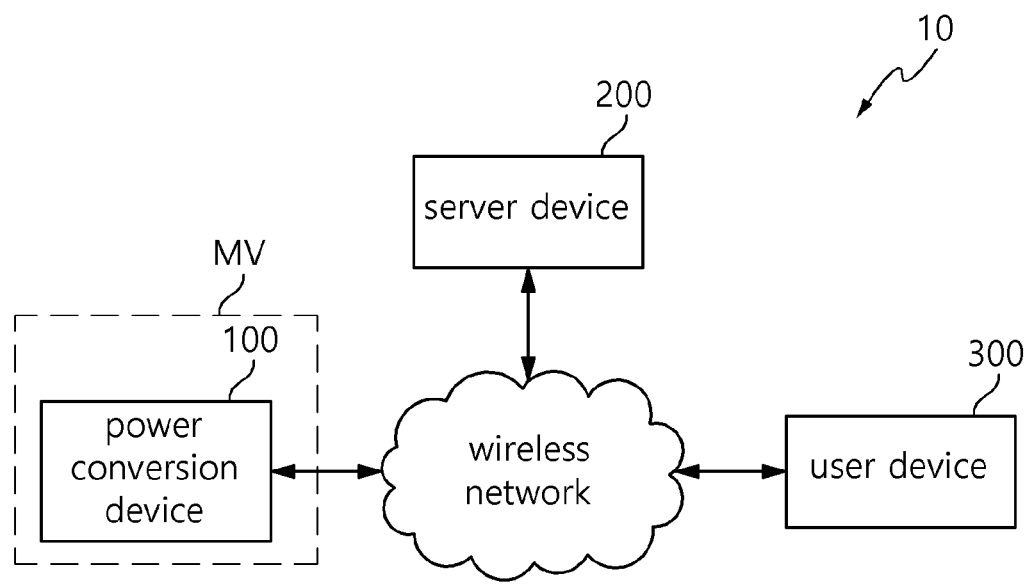
FIG. 1 is a view showing a vehicle power conversion system according to an embodiment of the present disclosure.

The present disclosure will be described in more detail.

Hereinafter, embodiments of the present disclosure and other matters necessary for those skilled in the art to easily understand the contents of the present disclosure will be described in detail with reference to the accompanying drawings. However, the present disclosure may be embodied in various different forms within the scope of the claims, so the embodiments described below are merely exemplary regardless of whether they are expressed or not.

The same reference numerals will refer to the same or like parts. In addition, in the drawings, thicknesses, ratios, and dimensions of components are exaggerated for effective description of technical content. "And/or" may include all combinations of one or more elements that the associated configurations may define.

Terms such as first, second, and the like may be used to describe various elements, but the elements should not be limited by the terms. The above terms are used only for the purpose of distinguishing one component from another. For example, without departing from a scope of claims of the present disclosure, a first component may be referred to as a second component, and similarly, a second component may also be referred to as a first component. A singular expression may include a plural expression unless the context clearly dictates otherwise.

In addition, terms such as "below", "under", "above", "on", and the like are used to describe a relationship between the components shown in the drawings. The above terms are relative concepts and are described on the basis of directions indicated in the drawings.

Terms such as "comprise" or "have" are intended to designate that a feature, number, step, operation, component, part, or a combination thereof described in the specification is present, and it should be understood that the terms do not preclude the possibility of the existence or addition of one or more other features, numbers, steps, operations, components, parts, or combinations thereof.

That is, the present disclosure is not limited to the embodiments disclosed below but may be implemented in various different forms. When it is said that a part is connected to another part in the following description, it may include not only a case in which the parts are directly connected but also a case in which the parts are electrically connected having another part therebetween. In addition, it should be noted that the same components in the drawings are indicated by the same reference numbers and symbols as much as possible even though they are indicated in different drawings.

FIG. 1 is a view showing a vehicle power conversion system 10 according to an embodiment of the present disclosure. With reference to FIG. 1, the vehicle power conversion system 10 may include a power conversion device 100, a server device 200, and a user device 300.

The power conversion device 100 may refer to a power conversion device for a vehicle MV in which at least a piece of electronic equipment is mounted. That is, the power conversion device 100 may control the supply of power to at least a piece of electronic equipment according to a state of the vehicle MV.

In the present disclosure, the at least a piece of electronic equipment is equipment for improving the convenience of the vehicle MV (for example, vehicle audio, black box, navigation, video, heating device, air conditioner, and the like) or may be equipment (for example, camping equipment, coolers, compressors, and the like) mounted for a special purpose (for example, camping, cold chain, and the like). However, the present disclosure is not limited thereto, and the electronic equipment described in the present disclosure may refer to various types of electronic equipment.

The server device 200 may store an operation history of the power conversion device 100. The server device 200 may monitor an operation state of the power conversion device 100 through a wireless network and store the operation history.

According to the embodiment, the server device 200 may be implemented with various terminal devices capable of arithmetic operations or a server having network functions. Here, the server may be implemented using server programs that are provided in various ways depending on the operating system such as DOS, Windows, Linux, UNIX, and Macintosh on general server hardware, and may be implemented as one or more servers operating in a cloud manner.

The server device 200 may be connected to an unspecified number of clients and/or other servers through an open computer network such as the Internet. The server device 200 may receive a request for performing a job from a client or another server and derive and provide a job result therefor.

The user device 300 may check the operation history of the power conversion device 100 through access to the server device 200. For example, the user device 300 may access the server device 200 through a wireless network and download the operation history of the power conversion device 100 stored in the server device 200.

Also, the user device 300 may access the power conversion device 100 through a wireless network and control the operation of the power conversion device 100. That is, the user device 300 may selectively drive pieces of electronic equipment included in the vehicle MV and may directly control the operation of the power conversion device 100 accordingly.

According to the embodiment, the user device 300 may be implemented with digital devices based on a vehicle center fascia, a smartphone, a tablet PC, a notebook computer, an Ultrabook, a mini PC, a microcontroller-based terminal device, a virtual terminal device, a display-integrated computer, a POS terminal-based device, and a Personal Digital Assistants (PDA), Mobile Internet Device (MID), Portable Multimedia Player (PMP), and the like.

Figure 2:
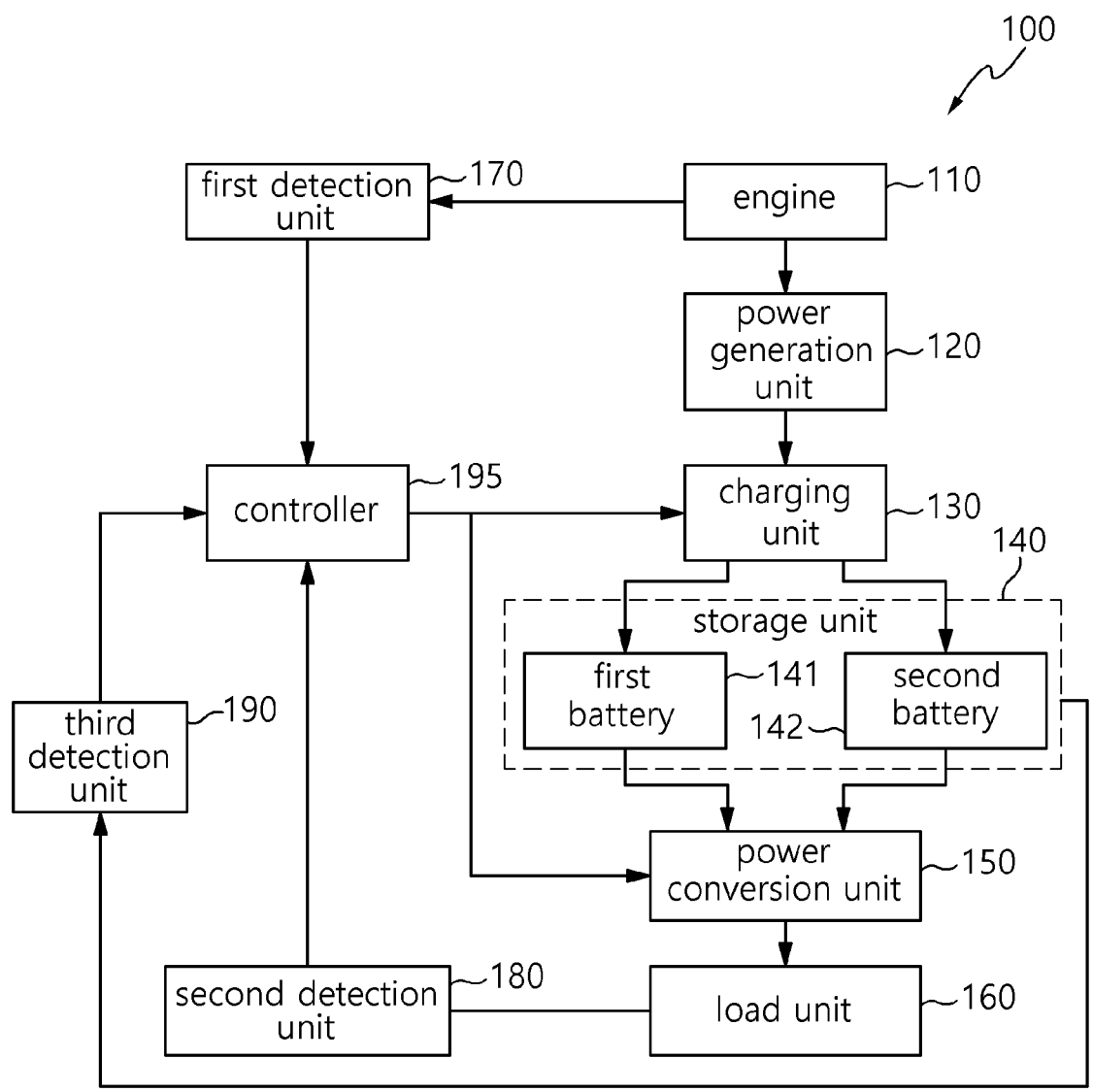
FIG. 2 is a view showing a power conversion device according to the embodiment of the present disclosure.

FIG. 2 is a view showing a power conversion device according to the embodiment of the present disclosure.

With reference to FIG. 2, the power conversion device 100 may include an engine 110, a power generation unit 120, a charging unit 130, a storage unit 140, a power conversion unit 150, a load unit 160, a first detection unit 170, a second detection unit 180, a third detection unit 190, and a controller 195.

The engine 110 may generate kinetic energy. For example, the engine 110 may mean an internal combustion engine of a vehicle.

Specifically, the engine 110 may generate mechanical power by burning fuel. When air and fuel are injected into the cylinder of the engine 110 and then ignited and exploded, the piston may move with the explosive force. The reciprocating motion of the piston generated through such a process may be converted into a rotational motion through a crank shaft.

The power generation unit 120 may convert the kinetic energy generated by the engine 110 of the vehicle into electrical energy. The power generation unit 120 may include at least one of a vehicle generator and an alternator.

For example, the power generation unit 120 may convert the kinetic energy generated by the engine 110 into the electrical energy. The power generation unit 120 may be connected to the crankshaft of the engine 110 to generate the electrical energy during the engine rotates.

Specifically, the power generation unit 120 may include a rotor and a stator, wherein the stator generates a magnetic effect and the rotor rotates therein to generate, as is opposed to the motor, an electromotive force. In such a principle, the power generation unit 120 may generate AC power in a range of 60 V to 100 V.

According to the embodiment, the power generation unit 120 may generate electrical energy of an alternating current (AC) power type. Although not shown in FIG. 2, the AC power generated by the power generation unit 120 may be converted into DC power (that is, a constant voltage) through a separately provided regulator.

The charging unit 130 may charge at least one of a first battery and a second battery on the basis of electrical energy according to a charging control signal.

The storage unit 140 may store electrical energy generated by the power generation unit 120. To this end, the storage unit 140 may include the first battery 141 and the second battery 142.

For example, the first battery 141 may be a vehicle main battery, which is mounted to be substantially fixed to the vehicle, and the second battery 142 may be an auxiliary battery that is coupled to be detachable to the vehicle independently of the first battery 141.

According to the embodiment, the first battery 141 may be implemented with a lead-acid battery, and the second battery 142 may be implemented with either a lithium battery or an iron phosphate battery.

The first battery 141 may have a first reference voltage, and the second battery 142 may have a second reference voltage. In this case, the first reference voltage and the second reference voltage may be different from each other. That is, the first reference voltage may be smaller than the second reference voltage. In this specification, the reference voltage of the battery may mean at least one of the charging voltage and the discharging voltage of the battery.

For example, the first battery 141 is a general vehicle battery used in general and may output a voltage of 12 V. The second battery 142 is an auxiliary battery and may output a voltage of 24 V.

Although not shown in FIG. 2, the power conversion device 100 may further include a converter for changing at least one of the voltages that are output from the first battery 141 and the second battery 142, respectively, to the operating voltage of the load.

The power conversion unit 150 may control the supply of power from the first battery 141 and the second battery 142 to the load unit 160 according to a conversion control signal generated by the controller 195. That is, the power conversion unit 150 includes a switching circuit and, in order to maintain a stable power supply to the load unit 160, may selectively connect the first battery 141 and the second battery 142 to the load unit 160. For example, the power conversion unit 150 to which the switching control signal is supplied may switch the connection to the load unit 160.

The load unit 160 may include at least a piece of electronic equipment that operates by receiving electrical energy stored in the storage unit 140. For example, the electronic equipment may include at least one of various types of convenience equipment or special purpose equipment.

The first detection unit 170 may generate first detection information by detecting an operating state of the engine 110 of the vehicle. For example, the first detection unit 170 may detect the operation state of the engine 110, that is, whether the engine is started by detecting whether a start signal is generated from a start-up unit of the vehicle. However, the present disclosure is not limited thereto, and within the scope of achieving the object of the present disclosure, the first detection unit 170 may detect the operating state of the engine 110 of the vehicle in various ways.

The second detection unit 180 may generate second detection information by detecting a state of charge of at least one of the first battery 141 and the second battery 142. For example, the second detection unit 180 may detect the state of charge by measuring the output voltages of the first battery 141 and the second battery 142. However, the present disclosure is not limited thereto, and within a scope of achieving the objective of the present disclosure, the second detection unit 180 may detect the state of charge of the battery in various ways. For example, the state of charge of the battery may indicate any one of full charge, non-charge, discharge, and overcharge.

The third detection unit 190 may generate third detection information by detecting the amount of power demand of the load unit 160. For example, the third detection unit 190 may detect the amount of power demand by calculating power consumption when the pieces of electronic equipment included in the load unit 160 operate.

The controller 195 may generate at least one of the switching control signal and the charging control signal on the basis of the first detection information, the second detection information, and the third detection information. For example, the controller 195 may control the overall operation of the power conversion device 100 according to a user control signal received from the user device 300 shown in FIG. 1.

Hereinafter, the operation of the power conversion device 100 according to a start-up state of the vehicle will be described in detail.

First, when the vehicle state is changed from start-up OFF to start-up ON, the charging unit 130 may charge the first battery 141 and not charge the second battery 142 during a stabilization period from a time of change. Here, the stabilization period is a preset period and may be changed by the user. That is, after the vehicle state is changed to the start-up ON, the output voltage of the power generation unit 120 may be in an unstable state. In this case, the charging unit 130 may stabilize the charging voltage and the discharging voltage of the first battery 141 during the stabilization period.

When the vehicle state is changed from the start-up OFF to the start-up ON, and then the output voltage of the power generation unit 120 is stabilized during the stabilization period, the charging unit 130 may selectively charge at least one of the first battery 141 and the second battery 142. In addition, when the vehicle state is changed from the start-up OFF to the start-up ON, and then a stabilization period elapses, the power conversion unit 150 may connect the first battery 141 and the load unit 160.

Thereafter, when the vehicle state is in the start-up ON, the power conversion unit 150 may continuously connect the first battery 141 and the load unit 160. For example, the load unit 160 may receive electrical energy from the power generation unit 120 through the charging unit 130 and the first battery 141.

When the vehicle state is changed from the start-up ON to the start-up OFF, there is no electrical energy supplied from the power generation unit 120, so the charging unit 130 may stop charging. In addition, the load unit 160 may not receive electrical energy through the power generation unit 120, the charging unit 130, and the first battery 141. Accordingly, in order to stably maintain power supply to the load unit 160, the power conversion unit 150 may connect the second battery 142 and the load unit 160.

Thereafter, when the vehicle state is in the start-up OFF, the power conversion unit 150 may continuously connect the second battery 142 and the load unit 160. For example, the load unit 160 may receive electrical energy from the second battery 142. In order to implement the above-described operation, the controller 195 may appropriately generate the charging control signal and the switching control signal.

Hereinafter, the operation of the power conversion device 100 according to the state of charge of the battery will be described in detail.

When the second battery 142 is in a full or overcharged state, the charging unit 130 may charge the first battery 141 and stop charging the second battery 142. That is, the performance of the lithium battery may be degraded when continuously charged in the full or overcharged state, so the charging unit 130 of the present disclosure may stop charging the second battery 142 to prevent the performance degradation of the second battery 142 implemented with a lithium battery.

When the second battery 142 is in a discharged state, the charging unit 130 may rapidly charge the second battery 142 and charge the first battery 141 at a relatively low speed. That is, the performance of the lithium battery may deteriorate when it is not continuously charged in a discharged state, so the charging unit 130 of the present disclosure may rapidly charge the battery 142 so as to prevent deterioration of the performance of the second battery 142 implemented with the lithium battery. In order to implement the above-described operation, the controller 195 may appropriately generate the charging control signal.

Hereinafter, the operation of the power conversion device 100 according to a change in the power demand of the load unit 160 will be described in detail.

When the vehicle state is in the start-up ON and the amount of power demand of the load unit 160 is changed, the charging unit 130 may control the amount of charging each of the first battery 141 and the second battery 142.

For example, when the amount of power demand of the load unit 160 increases, the charging unit 130 may increase the amount of charge in the first battery 141 and reduce the amount of charge in the second battery 142, by the amount corresponding to the increase in the amount of power demand. In addition, when the amount of power demand of the load unit 160 decreases, the charging unit 130 may reduce the amount of charge in the first battery 141 and increase the amount of charge in the second battery 142, by the amount corresponding to the decrease in the amount of power demand. In order to implement the above-described operation, the controller 195 may appropriately generate the charging control signal.

According to the embodiment, the second battery 142 may be integrated as a battery module with at least one of the charging unit 130, the power conversion unit 150, the first detection unit 170, the second detection unit 180, the third detection unit 190, and the controller 195 to be integrally implemented. In this case, the battery module may be coupled to be detachable to the vehicle.

Figure 3:
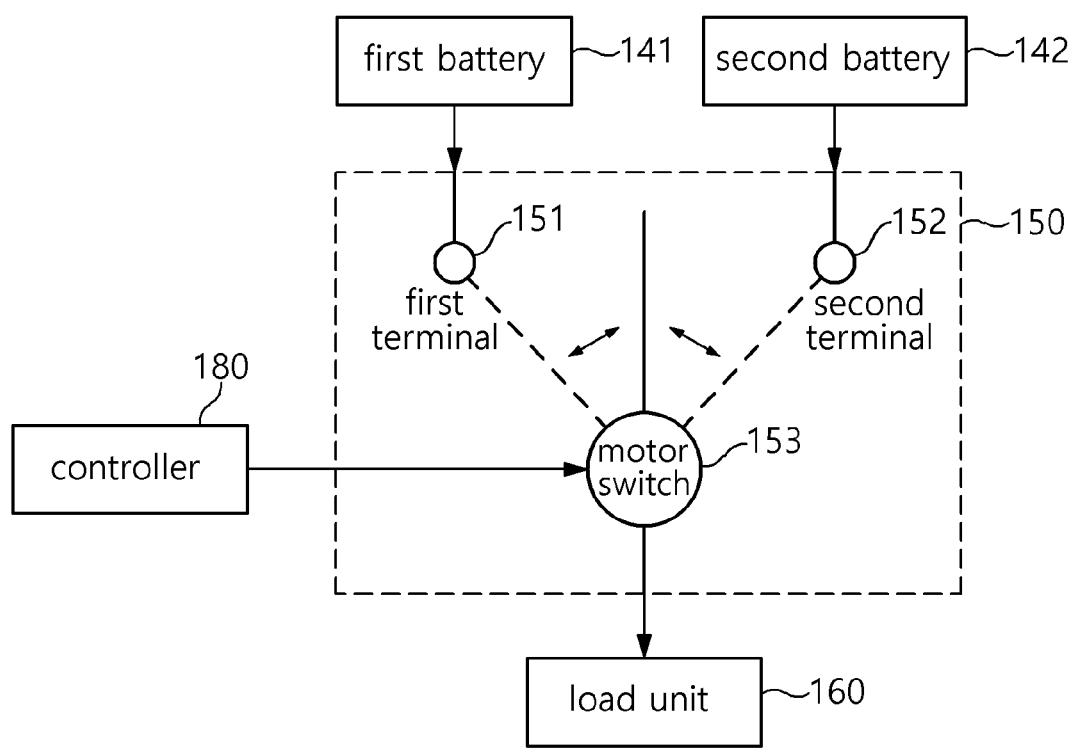
FIG. 3 is a view showing a power conversion unit according to the embodiment of the present disclosure.

FIG. 3 is a view showing a power conversion unit according to the embodiment of the present disclosure.

With reference to FIG. 3, the power conversion unit 150 may include a first terminal 151, a second terminal 152, and a motor switch 153.

The first terminal 151 may be connected to the first battery 141. That is, the first terminal 151 means a terminal for transmitting electrical energy supplied from the first battery 141 to the load unit 160.

The second terminal 152 may be connected to the second battery 142. That is, the second terminal 152 means a terminal for transmitting electrical energy supplied from the second battery 142 to the load unit 160.

The motor switch 153 may be connected to the load unit 160. For example, the motor switch 153 may have a switching speed to be switched within 10 ms. Through this, the power conversion device of the present disclosure may implement a stable operation of the vehicle electronic equipment.

According to the embodiment, the motor switch 153 may rotate according to the switching control signal to connect the load unit 160 to any one of the first terminal 151 and the second terminal 152.

As shown, the motor switch 153 may include a conductive rod for electrical connection and a motor M for rotating the conductive rod. However, the present disclosure is not limited thereto, and the motor switch 153 may include various configurations within the scope of achieving the objective of the present disclosure.

Through the above-described method, the power conversion device of the present disclosure and the vehicle power conversion system including same have an effect of stably supplying power to the load according to the vehicle state.

In addition, the power conversion device of the present disclosure and the vehicle power conversion system including the same have an effect of improving productivity by lowering manufacturing costs while maintaining a high switching speed.

The functional operations described herein and the embodiments related to the present subject matter, including a structure disclosed herein and structural equivalents thereof, may be implemented in a digital electronic circuit or computer software, firmware or hardware, or a combination of one or more of these.

The embodiment of the subject matter described herein may be implemented as one or more modules related to computer program instructions encoded on a tangible program medium for execution by or for controlling the operation of computer program products, that is, a data processing device. The tangible program medium may be a full wave type signal or a computer-readable medium. The full wave type signal is an artificially generated signal such as an electrical, optical, or electromagnetic signal, which is machine-generated and is generated to encode information, for transmission to an appropriate receiver device for execution by a computer. The computer-readable medium may be a machine-readable storage device, a machine-readable storage substrate, a memory device, a combination of materials that affect a machine-readable full wave type signal, or a combination of one or more of these.

A computer program (also known as a program, software, software application, script, or code) may be written in any form of any programming language including compiled or interpreted language or a priori or procedural language and deployed in any form including a stand-alone program or module, components, subroutines, or other units suitable for use in a computer environment.

The computer program does not necessarily correspond to a file on a file device. The program may be stored in a single file provided to the requested program, in multiple interacting files (for example, one or more files storing modules, subprograms, or portions of a code), or in a portion (for example, one or more scripts stored within a markup language document) of a file holding other programs or data.

The computer program may be deployed to be executed on multiple computers or a single computer, which are located at one site or distributed over a plurality of sites and interconnected by a communication network.

Additionally, the logic flows and structure block diagrams described in the present patent document describe corresponding functions supported by structural means disclosed herein and corresponding acts and/or specific methods supported by structural steps disclosed herein, and may also be used to build corresponding software structures and algorithms and equivalents thereof.

The processes and logic flows described herein may be performed by one or more programmable processors executing one or more computer programs to perform functions by operating on input data and generating outputs.

Processors suitable for the execution of computer programs include, for example, both general and special purpose microprocessors and any one or more processors of any form of digital computer. Typically, the processor will receive instructions and data from either read-only memory, random access memory, or both.

Key component of a computer are one or more memory devices for storing instructions and data and processors for executing the instructions. In addition, a computer is generally combined to be operable to receive data from, transmit data to, or perform both operations on one or more mass storage devices, for example, such as magnetic disks, magneto-optical disks, or optical disks for storing data or configured to include the mass storage devices. However, the computer need not have such a device.

The present description sets forth the best mode of the present disclosure and provides examples to illustrate the present disclosure, and to enable any person skilled in the art to make or use the present disclosure. The specification written like this does not limit the present disclosure to the specific terms presented.

Although the above has been described with reference to the exemplary embodiments of the present disclosure, those skilled in the art or those having ordinary knowledge in the technical field will be understood that various modifications and variations of the present disclosure may be made without departing from the scope of the present disclosure described in the claims to be described later.

Accordingly, the technical scope of the present disclosure should not be limited to the content described in the detailed description of the specification but should be defined by the claims.

The invention claimed is:

1. A power conversion device, the device comprising:
   a power generation unit for converting kinetic energy generated by an engine of a vehicle into electrical energy;
   a storage unit including a first battery and a second battery for storing the electrical energy generated by the power generation unit;
   a load unit for operating by receiving the electrical energy stored in the storage unit;
   a power conversion unit for controlling supply of power from the first battery and the second battery to the load unit according to a conversion control signal;
   a charging unit for charging at least one of the first battery and the second battery on the basis of the electrical energy according to a charging control signal;

a first detection unit for generating first detection information by detecting an operating state of the engine of a vehicle;

a second detection unit for generating second detection information by detecting a state of charge of at least one of the first battery and the second battery;

a third detection unit for generating third detection information by detecting the amount of power demand of the load unit; and a controller for generating at least one of the switching control signal and the charging control signal on the basis of the first detection information, the second detection information, and the third detection information, wherein, when a vehicle state is in start-up ON, the power conversion unit connects the first battery and the load unit, when the vehicle state is in start-up OFF, the power conversion unit connects the second battery and the load unit, and the second battery is coupled to be detachable to the vehicle independently of the first battery.

2. The device of claim 1, wherein the power conversion unit comprises:

a first terminal to which the first battery is connected;

a second terminal to which the second battery is connected; and a motor switch connected to the load unit and configured to rotate according to a switching control signal for connecting the load unit to any one of the first terminal and the second terminal.

3. The device of claim 1, wherein, when the vehicle state is changed from the start-up OFF to the start-up ON, the charging unit charges only the first battery during a stabilization period, and after the stabilization period elapses, the power conversion unit connects the first battery and the load unit.

4. The device of claim 1, wherein the first battery has a first reference voltage, the second battery has a second reference voltage, and the first reference voltage and the second reference voltage are different from each other.

5. The device of claim 4, wherein the first reference voltage is smaller than the second reference voltage.

6. The device of claim 1, wherein the second battery is integrated as a battery module with at least one of the charging unit, the power conversion unit, the first detection unit, the second detection unit, the third detection unit, and the controller to be integrally implemented.

7. The device of claim 1, wherein, when the second battery is in a full or overcharged state, the charging unit charges only the first battery.

8. The device of claim 1, wherein, when the vehicle state is in the start-up ON, and when the amount of power demand of the load unit is changed, the charging unit controls the amount of charging each of the first battery and the second battery.

9. A vehicle power conversion system, the system comprising:

a power conversion device for controlling supply of power to at least one piece of electronic equipment according to a state of a vehicle;

a server device for monitoring an operation state of the power conversion device through a wireless network and storing operation history; and a user device for checking the operation history of the power conversion device through access to the server device, wherein the power conversion device comprises:

a power generation unit for converting kinetic energy generated by an engine of the vehicle into electrical energy;

a storage unit including a first battery and a second battery for storing the electrical energy generated by the power generation unit;

a load unit for operating by receiving the electrical energy stored in the storage unit;

a power conversion unit for controlling supply of power from the first battery and the second battery to the load unit according to a conversion control signal;

a charging unit for charging at least one of the first battery and the second battery on the basis of the electrical energy according to a charging control signal;

a first detection unit for generating first detection information by detecting an operating state of the engine of a vehicle;

a second detection unit for generating second detection information by detecting a state of charge of at least one of the first battery and the second battery;

a third detection unit for generating third detection information by detecting the amount of power demand of the load unit; and a controller for generating at least one of the switching control signal and the charging control signal on the basis of the first detection information, the second detection information, and the third detection information, wherein, when a vehicle state is in start-up ON, the power conversion unit connects the first battery and the load unit, when the vehicle state is in start-up OFF, the power conversion unit connects the second battery and the load unit, and the second battery is coupled to be detachable to the vehicle independently of the first battery.

* * * * *